United States Patent Office 3,709,978
Patented Jan. 9, 1973

3,709,978
PROCESS FOR PURIFYING INDUSTRIAL WASTE GASES CONTAINING HYDROGEN FLUORIDE
Hans H. Predikant, Hailer, Germany, assignor to Universal Oil Products Company, Des Plaines, Ill.
Filed Nov. 9, 1970, Ser. No. 87,688
Claims priority, application Germany, Dec. 24, 1969, P 19 64 746.2
Int. Cl. B01d 53/14; C01b 7/22; C01d 3/02
U.S. Cl. 423—240                                    6 Claims

ABSTRACT OF THE DISCLOSURE

A multi-stage method for scrubbing a waste gas stream containing HF and $SO_2$ such as from the aluminum production industry where aluminum dust can also be present. Control of wash streams is maintained to preclude too much HF reaching the second stage washing zone cause sodium fluoride to precipitate and then block valves and piping. A combined effluent from each wash stage is passed to a neutralization zone where an alkaline stream such as caustic soda will cause precipitation of sodium fluoride and sodium sulphate along with entrained dust or aluminum particulates.

---

The invention relates to a continuous process for purifying industrial waste gases having a content of fluorine and/or hydrogen fluoride. Such waste gases are generated, for example, during the production of aluminum from alumina, usually from bauxite, by melting flux electrolysis, cryolite ($Na_3AlF_6$) being used as fluxing agent. Additionally to fluorine compounds, such as hydrogen fluoride and elementary fluorine, such waste gases from the aluminum industry generally contain also dust and sulphur dioxide.

From the German Pat. 1,107,946 already a process for purifying gases from furnaces for the production of aluminum by melting flux electrolysis is known, by which process the gases are washed by means of alkali-containing washing water having a pH-value below 7, preferably below 5. During said process, where the washing water is optionally recycled partially, acidic fluorides are formed which are converted to cryolite.

From the U.S. Pat. 2,813,000 a similar process is known, whereby also in a single washing water cycle the waste gases are washed by means of a washing liquid having an acidic pH-range from 1.0 to about 5.5, whereafter the washing water is neutralized by means of alkali, and the precipitated and separated sodium fluoride is converted to cryolite. However, both processes have the disadvantage that the purifying effect relating to the hydrogen fluoride is not sufficient in many cases, and that, for example, by the latter process only a decrease of the content of hydrogen fluoride to 15 to 30 mg. per Nm.³ (normal cubic meter) of the purified gases is obtained. Moreover, by the known processes in the neutralization step sewages are formed which are undesirable in many industries.

For obtaining improved purities of the treated waste gases, further a continuous process has been suggested, in which process two washing liquid cycles are used successively. By said process within the first washing zone, there is washed by means of aqueous hydrogen fluoride and said hydrogen fluoride is recycled to the first washing zone until the concentration of hydrogen fluoride is at least 3 percent by weight. Within the second washing zone, there is then washed by means of diluted aqueous sodium hydroxide, and said washing liquid is recycled to the second washing zone, so that the sodium fluoride within the second washing liquid is concentrated, but only as long as the concentration of the sodium fluoride is still below the solubility product of the sodium fluoride. Successively, the effluent of both washing zones are combined within a neutralization zone, the sodium fluoride precipitated thereby is separated and the mothe liquor of the neutralization is recycled to the first washing zone.

By aqueous sodium hydroxide within the second washing zone substantial amounts of sulphur dioxide are absorbed which sulphur dioxide has to be separated before converting the sodim fluoride to cryolite. In several cases, this is a disadvantage, namely, if the waste gases to be purified contain remarkable amounts of sulphur dioxide, and if it is not necessary to remove also the sulphur dioxide from the waste gases.

Thus, it is an object of the present invention to overcome said disadvantages of the above-mentioned known methods and to improve the suggested process for special conditions of application. Especially according to the process of the invention, waste gases shall be purified to a content of hydrogen fluoride of at most 1 mg. per Nm.³, and thereby sodium fluoride shall be obtained which contains as little sulphur dioxide or sodium sulfite as possible. Moreover, by the process, no or, if any, as little as possible of sewages shall be withdrawn from the process. These and other advantages are obtained by the process of the present invention.

The said continuous process according to the invention for purifying industrial waste gases containing fluorine and/or hydrogen fluoride by washing the waste gases within the first washing zone by means of recycled aqueous hydrogen fluoride and within a second washing zone by means of a recycled aqueous solution, transferring said aqueous hydrogen fluoride from the first washing zone to a neutralization zone, neutralization of the hydrogen fluoride by means of aqueous sodium hydroxide or sodium carbonate, separation of the sodium fluoride formed thereby and recycling the mother liquor as washing liquid is characterized in that the aqueous hydrogen fluoride of the first washing zone is enriched by recycling with hydrogen fluoride to a content of 1.0 to 2.9 percent by weight, the aqueous solution of the second washing zone is adjusted by recycling and continuous addition of water to a content of free hydrogen fluoride of from 0.01 to 0.5 percent by weight, continuously a part of the aqueous solution recycled through the second washing zone is introduced into the aqueous hydrogen fluoride recycled through the first washing zone, continuously or discontinuously a part of the aqueous hydrogen fluoride recycled through the first washing zone is transferred to the neutralization zone and at least a part of the mother liquor is recycled to the aqueous solution recycled through the second washing zone.

In order to obtain no sewage or as little sewage as possible within the first washing zone, the concentration of hydrogen fluoride is increased by corresponding recycling, whereby the effluent of the first washing zone is recycled to said washing zone. However, according to the invention, the concentration of hydrogen fluoride within the first stage shall not exceed 2.9 percent by weight, since at about 3 percent by weight the vapor pressure of the hydrogen fluoride is so large that too much hydrogen fluoride reaches the second washing zone, so that the desired final purity of the waste gases cannot be obtained. The second washing zone must follow the first washing zone, in order to obtain said desired final purity of the waste gases of at most one mg. of hydrogen fluoride and/or fluorine per Nm.³, and to maintain the vapor pressure of the hydrogen fluoride within said second washing zone sufficiently low, a concentration of hydrogen fluoride within said washing zone is adjusted according to the invention to a range of from 0.01 to 0.5 percent by weight of free hydrogen fluoride. Said control of the concentration is carried out by recycling the effluent of the second washing zone to said washing zone and by continuous addition of fresh water to said second cycle of washing liquid.

Suitably into the cycle of washing liquid through the second washing zone, aqueous sodium hydroxide or sodium carbonate is introduced to obtain a buffer action, however, in this case only as much alkali may be added that the washing liquid recycled through the second washing zone maintains an acidic pH-value. If the pH-value of the washing liquid of the second washing zone would be displaced to the alkaline range, as mentioned above, too much sulphur dioxide would be absorbed, and this would be undesirable in the present process.

The maximum limit of the concentration of hydrogen fluoride of 2.9 percent by weight within the washing liquid of the first washing zone results from the fact that by exceeding said maximum limit too much sodium fluoride is precipitated within the washing liquid cycle of the second washing zone and there exists the risk of obstruction of valves and tubings, since the amount of hydrogen fluoride reaching the second washing zone from the first washing zone would be too large.

It is not necessary that the aqueous sodium hydroxide or aqueous solution of sodium carbonate added to the washing liquid within the second washing zone according to the preferred embodiment of the present method is directly introduced into the cycle through the second washing zone, but alternately there can be introduced suitably a stoichiometric excess of alkali in the form of sodium hydroxide or sodium carbonate into the neutralization zone, so that after separation of the sodium fluoride precipitated within the neutralization zone, the mother liquor recycled to the washing liquid cycle through the second washing zone is alkaline and serves as alkali source for the second washing zone.

From the effluent of the second washing zone continuously a part is transferred to the washing liquid cycled through the first washing zone. But, since the industrial waste gases to be purified have generally an elevated temperature, for example, of 90° C., a part of the washing water recycled through the first washing zone is evaporated adiabatically, and an essential portion thereof leaves the second washing zone together with the purified waste gas. Therefore, there has to be added continuously sufficient fresh water to the washing liquid recycled through the second washing zone to compensate the water removed from the cycle through the first washing zone by adiabatic evaporation. However, since the amount of fresh water added to the washing liquid recycled through the second washing zone is primarily dependent from the desired concentration of free hydrogen fluoride, it is suitable to add continuously fresh water also to the washing liquid recycled through the first washing zone. By corresponding control of the addition of fresh water and of the amount of washing liquid transferred from the cycle through the second washing zone to the cycle through the first washing zone to the neutralization zone, it is possible to maintain constantly the necessary concentrations of hydrogen fluoride in both cycles of the washing liquid in a simple manner. If the composition of the waste gases to be purified changes by means of adjustable valves within the conduits for adding fresh water and the stated transfer conduits from the second to the first cycle of washing liquid and from the first cycle of washing liquid to the neutralization zone, said composition can be controlled. It is suitable to keep continuously also the transfer of washing liquid from the first cycle of washing liquid to the neutralization zone.

By the continuous operation of the present method after a running-in-period, the effluents of both washing zones will have a special concentration of sulphur dioxide, whereby the main amount of the sulphur dioxide dissolved physically within the second washing zone is expelled again within the first washing zone by the stronger acidity of the washing liquid used therein. Thus, the washing liquid reaching the neutralization zone contains only small amounts of sulphur compounds which are converted to sodium sulphate by the neutralization, while the main portion of the sulphur dioxide is delivered, as requested, together with the waste gases from the second washing zone freed from hydrogen fluoride.

Within the neutralization zone by addition of sodium hydroxide or sodium carbonate the solubility product of the sodium fluoride formed thereby is exceeded in any case, so that the separation thereof from the mother liquor can be carried out in a simple manner by centrifuging or filtering or in another known manner, whereafter then the mother liquor recovered by the separation can be recycled entirely or partly to the washing liquid cycled through the second washing zone. Thereby, it is possible to operate the present process, so that no sewages are obtained.

By the drawing which shows diagrammatically a flow sheet of the method according to the invention, said invention is further illustrated. For the reason of clearness, the drawing shows the two washing zones arranged one after the other, however, it is also possible to provide both washing zones one upon the other within one casing.

In the shown flow sheet, the two scrubbers connected in a row have the reference numerals 1 and 2. Each of these scrubbers contains perforated trays penetrable for gases and liquids, and between said trays a fluidized bed of spherical packings 4 is provided. Above the perforated trays 3, a liquid spray diffuser 5 and above said liquid spray diffusers drop separators 6 are provided.

Through a blower 7, the waste gases to be purified, for example at a temperature of 90° C., are introduced through conduit 8 into the lower part of the scrubber 1 and flow countercurrently to the washing liquid through the perforated trays 3, the fluidized beds of packings 4 and the drop or mist separator 6 and then leave the scrubber 1 at the other end thereof. Within the scrubber 1, an adiabetic refrigeration of the waste gases to be purified occurs, whereby a portion of the water of the washing liquid is evaporated and leaves the other end of the scrubber 1 together with prepurified waste gases.

The waste gases prepurified in said manner enter through conduit 9, the lower section of the scrubber 2 and flow again countercurrently to the washing liquid through the perforated trays 3, the fluidized beds of packings 4 and the drop separator 6 and leaves the scrubber 2 through conduit 10, from where they are delivered to the atmosphere or introduced into a not shown postpurifying unit for removing sulphur dioxide.

Through conduit 11 and valve 12 fresh water is introduced into the collecting container 13 of the scrubber 1, and through conduit 14 and pump 15 the washing liquid is recycled from the collecting container 13 to the liquid spray diffusers of the scrubber 1 and constantly recycled through the said members and conduit 16. In the same manner, the washing liquid within the collecting container 17 of the scrubber 2 is recycled through the conduit 18 and pump 19 to the liquid spray diffusers of the scrubber 2 and is constantly recycled through said scrubber and conduit 20. Through conduit 21 and valve 22 also to the collecting container 17 continuously fresh water is added, and through conduit 23 and valve 24 continuously a portion of the washing liquid of the collecting container 17 of the scrubber 2 is transferred to the collecting container 13 of the scrubber 1.

Preferably, continuously a portion of the washing liquid is transferred from the collecting container 13 through conduit 25 and valve 26 to the neutralization container 27 and combined there with alkaline solution from conduit 28, for example, with aqueous sodium hydroxide or sodium carbonate. Thereby, the hydrogen fluoride within the washing liquid is converted to sodium fluoride having a concentration that the solubility product is exceeded and the sodium fluoride is precipitated. Through conduit 29 and valve 30 the neutralization mixture is introduced into a centrifuge or another separator unit 31, from where the solid sodium fluoride mixed with dust and little sodium sulphate is withdrawn as solid 32 and introduced into a unit 33 to convert it to cryolite. The mother liquor of the centrifuge 31 is introduced through conduit 34 into the collecting container 17 of the scrubber 2.

Preferably, there is added through conduit 28 a stoichiometric excess of alkaline solution to the neutralization container 27, so that the mother liquor introduced through container 34 into the collecting contanier 17 still contains alkali. Additionally, or if to the neutralization container 27 only stoichiometric amounts of alkali are added, through conduit 35 additional aqueous sodium hydroxide or aqueous solution of sodium carbonate can be added to the collecting container 17.

By control of the valves 12, 22, 24 and 26 as well as the circulating speed through the pumps 15 and 19, the concentration of hydrogen fluoride within the washing liquids of the scrubbers 1 and 2 is adjusted to a special value within the claimed ranges. Preferably, the concentration of hydrogen fluoride within the washing liquid cycled through the scrubber 1 is within the range of from 1.3 to 1.5 percent by weight, and the concentration within the washing liquid cycled through the scrubber 2 is preferably within the range of from 0.05 to 0.2 percent by weight.

The following example serves as further illustration of the invention.

EXAMPLE

Waste gas to be purified from the production of aluminum by smelting flux electrolysis was supplied in an amount of 2000 Nm.$^3$, to the apparatus described above. Said waste gas had a temperature of 90° C., a dust content of 140 mg. per Nm.$^3$, a $SO_2$ content of 83 mg. per Nm.$^3$ and a content of fluorine and hydrogen fluoride, calculated as fluorine, of 60 mg. per Nm.$^3$.

After passing the scrubber 1, the temperature of the waste gases was about 30° C., the dust content 70.0 mg. per Nm.$^3$, the $SO_2$ content 74.0 mg. per Nm.$^3$ and the fluorine content 16.4 mg. per Nm.$^3$. After passing the scrubber 2, the fluorine content was less than 1 mg. per Nm.$^3$.

Through conduit 21 1560 l./hr. (liter per hour) of fresh water entered the collecting container 17 containing 50 m.$^3$ of washing liquid. Said 50 m.$^3$ of washing liquid contained after a running-in period 50 kg. of hydrogen fluoride, 105 kg. of sodium fluoride, 90 kg. of dust and 119 kg. of sulphur dioxide. Through conduit 23 some 1560 l./hr. of overflow from the collecting container 17 entered the collecting container 13 which contained also 50 m.$^3$ of washing liquid. Said 50 m.$^3$ of washing liquid contained 650 kg. of hydrogen fluoride, 180 kg. of sodium fluoride, 130 kg. of sodium sulphate, 780 kg. of dust and 153 kg. of sulphur dioxide. From conduit 11 additionally 540 l./h. of fresh water were introduced into the collecting container 13.

From the collecting container 13 some 513 l./hr. of washing liquid and from conduit 28 an aqueous solution of 15.2 kg. of caustic soda were introduced into the neutralization container 27. From the neutralization mixture per hour 24 kg. of sodium fluoride, 4.8 kg. of sodium sulphate and 8.0 kg. of dust were obtained. Within the centrifuge 31 the solids of the neutralization mixture were separated from the mother liquor and said mother liquor was recycled through conduit 34 to the collecting container 17.

By said operation the treated waste gas was purified to a content of hydrogen fluoride of less than 1 mg. per Nm.$^3$, and no sewages were formed which would have to be withdrawn from the unit.

I claim as my invention:

1. A continuous process for purifying industrial waste gases containing at least one component selected from the group consisting of fluorine and hydrogen fluoride by washing the waste gases within a first washing zone by means of a recycled aqueous hydrogen fluoride containing solution and within a second washing zone by means of a recycled aqueous solution, transferring aqueous hydrogen fluoride from the first washing zone to a neutralization zone, neutralizing the hydrogen fluoride by means of aqueous sodium hydroxide or sodium carbonate, separating the sodium fluoride formed thereby and recycling the mother liquor as first said washing liquid, characterized in that the aqueous hydrogen fluoride for said first washing zone is enriched with hydrogen fluoride by recycling to a content of from 1.0 to 2.9 percent by weight, while the aqueous solution of the second washing zone is adjusted to maintain a content of from 0.01 to 0.5 percent by weight of free hydrogen fluoride by recycling and continuous addition of water, continuously passing a portion of the aqueous solution cycled through the second washing zone into admixture with the aqueous hydrogen fluoride cycled through the first washing zone, withdrawing at least a portion of the aqueous hydrogen fluoride cycled through the first washing zone and transferring it to said neutralization zone and passing at least a portion of the mother liquor separated from the latter zone into admixture with the aqueous solution being cycled through the second washing zone.

2. The process according to claim 1 further characterized in that the aqueous hydrogen fluoride of the first washing zone is enriched with hydrogen fluoride to a content of from 1.3 to 1.5 percent by weight and the aqueous solution of the second washing zone is adjusted to a content of from 0.05 to 0.2 percent of free hydrogen fluoride.

3. The process according to claim 2 further characterized in that there is added aqueous sodium hydroxide or sodium carbonate to the aqueous solution cycled through the second washing zone in such an amount that an acidic pH-value is maintained.

4. The process according to claim 3 still further characterized in that the aqueous sodium hydroxide or sodium carbonate is added as excess to the neutralization zone and introduced into the aqueous solution cycled through the second washing zone together with the mother liquor.

5. The process according to claim 1 further characterized in that there is water continuously added to the aqueous hydrogen fluoride cycled through the first washing zone.

6. The process according to claim 1 further characterized in that a portion of the aqueous hydrogen fluoride from the first washing zone is transferred continuously to said neutralization zone.

References Cited

UNITED STATES PATENTS

| | | | |
|---|---|---|---|
| 1,914,425 | 6/1933 | Henglein et al. | 23—153 |
| 2,385,208 | 9/1945 | Jones | 23—2 R |
| 2,690,815 | 10/1954 | Calfee et al. | 23—153 X |
| 2,753,245 | 7/1956 | Mitchell et al. | 23—153 |
| 2,813,000 | 11/1957 | Quittenton | 23—88 X |
| 3,219,410 | 11/1965 | Dexter et al. | 23—153 |
| 3,273,713 | 9/1966 | Parish | 23—153 |

EDWARD STERN, Primary Examiner

U.S. Cl. X.R.

423—481